United States Patent [19]

Remy et al.

[11] 3,720,780

[45] March 13, 1973

[54] PCM DIGITAL COLOR TELEVISION SYSTEM

[75] Inventors: Maurice A. Remy, Clamart; Daniel M. Tartary, Versailles, both of France

[73] Assignee: Office De Radiodiffusion-Television Francaise, Paris, France

[22] Filed: Aug. 30, 1971

[21] Appl. No.: 176,195

[30] Foreign Application Priority Data

Aug. 31, 1970 France ................................7031704

[52] U.S. Cl. ......178/5.2 R, 178/DIG. 3, 178/DIG. 23

[51] Int. Cl. ..............................................H04n 9/40

[58] Field of Search .......178/5.2 R, DIG. 3, DIG. 23; 325/38 R, 38 A, 38 B, 39

[56] References Cited

OTHER PUBLICATIONS

U.S. Dept. Commerce – National Technical Information Service – Access No. PB 178993 "A15 to 25 MHz Digital Television System for Transmission of Commercial Color Television" L. Golding Dec. 19, 1967, pp. 1–25.

*Primary Examiner*—Robert L. Griffin
*Assistant Examiner*—George G. Stellar
*Attorney*—Abraham A. Saffitz

[57] ABSTRACT

Digital PCM coded color television system in which the image is transmitted at a rate of two bits per image point. The luminance is transmitted by a word of $p$ bits every p/2 points and the luminance increments corresponding to the "image contour points" are transmitted by two bits. Color words which are formed of samples of two color components of the image are stored in color transmit storing means and the addresses of the color words in said storing means are transmitted in lieu of the color words themselves. A receive storing means is provided at the receiver station and it is updated from the transmit storing means during the line blanking periods.

5 Claims, 4 Drawing Figures

INVENTORS:
Maurice A. REMY
AND Daniel M. TARTARY
By Abraham A. Saffitz
ATTORNEY

INVENTORS:
Maurice A. REMY
AND Daniel M. TARTARY
By Abraham A. Saffitz
ATTORNEY

INVENTORS:
Maurice A. REMY
AND Daniel M. TARTARY
By Abraham A. Saffitz
ATTORNEY

PCM DIGITAL COLOR TELEVISION SYSTEM

The present invention relates to the transmission and reception of color television signals and more particularly to a pulse code modulation color television transmission system. Such systems ordinarily require considerable transmission channel capacity.

The advantages of pulse code modulation for electrical signal transmission are well known, particularly as regards relative insensitivity to noise and transmission distortion. It has been proposed to directly code in this way a color television signal already coded in one of the conventional systems NTSC, PAL or SECAM. Unfortunately, an information channel capacity of the order of 100 Megabits per second is needed in order not to seriously degrade the color image transmitted. The resulting large channel capacity required for transmission is an economic defect in such a system, and ways and means for reducing the necessary channel capacity are constantly being sought.

Among the systems proposed to accomplish this reduction two main approaches have been used. One approach comprises splitting the communication color signal into chrominance components, either the red (R), green (G) and blue (B) color signals or the luminance (Y) and two orthogonal components of the chrominance signal (Q and I or (R-Y) and (B-Y)), and sampling certain of these components, namely the red and blue components or the chrominance signal components, at a specified rate lower than that applied to the other components (green signal or luminance signal). As the signals (R-Y) and (B-Y) of the PAL and SECAM systems and the signal Q and I of the NTSC system are more or less proportional to the luminance Y, it has been proposed to select as chrominance components either the dominant wavelength and the color saturation or the signals (R-Y)/Y and (B-Y)/Y which are completely independent of Y.

The other approach is to take advantage for encoding the luminance or green signal of point-to-point correlation along a scanning line or frame-to-frame correlation as efficiently exploited in monochrome television in order to reduce transmission bit rate. In this technique, as disclosed in the Bell System Technical Journal, Vol. 48, September 1960, No. 7, pages 2545–2554, only those elements that change between successive frames are encoded, instead of encoding every element of every frame. A problem associated with this technique is that it requires a frame memory of sufficient capacity to hold data relating to as many elements as there are in two complete frames. As this memory must contain for each picture element the address thereof in the scanning line, the number of words to be held in the memory and the number of bits in each word are prohibitive for television broadcasting. The method has only been applied to picturephone.

None of the heretofore developed methods of reducing PCM transmission channel capacity for color television signals exploits the fact that in a color image, only few colors are simultaneously present, particularly if only the colors along a scanning line are considered. In fact the luminance of an object can vary widely from one point to another according to its form, its surface state and the illumination conditions, but in most of the practical cases, its color is quasi-uniform. Thus it seems unnecessary to transmit, for each point of the object, the two quantities defining the color. As regards channel capacity saving, it is preferable to transmit once and for all, at the beginning of each scanning line, the quantities defining the color which will be encountered along the line, to store these quantities in the different compartments of a store, then to transmit for each point of the line, the address of the compartments wherein are stored the quantities defining the color of the point. As the number of different colors is small, the number of the compartments will also be small and the address of each compartment will comprise a small number of bits, four or five at most.

It will be appreciated that, as opposed to the video encoding systems exploiting reduncancy due to frame-to-frame correlation by storing the picture parameters of all the points of two complete frames, the new system provided by the invention uses only a small capacity store, say of some hundred bits.

It is the object of the invention to provide a pulse code modulation color television transmission system using only two bits per image point.

The image may be analyzed and reconstituted according to the usual commercial television standards, that is to say 625 lines at 25 images per second or 525 lines at 30 images per second, with red, green and blue images, but the system provided by the invention is applicable to images analyzed according to other standards, picture-phone standard for example. If F is the frequency at which the points on the transmitted image are sampled, the data flow rate is equal to two F bits per second. Generally, F is equal to 10 to 15 million points per second. The maximal frequency of the corresponding electric signal is consequently F MHz in the case of a binary or pseudo-ternary (bipolar) signal without return to zero. This frequency of 10 to 15 MHz is well compatible with the majority of television transmission circuits currently in existence.

In the new system there are separately and successively transmitted data "A" corresponding to sharp transitions in the images (horizontal contour signal) coded with $a = 2$ bits per point, and data "P" corresponding to the wide expanses between such transitions. The luminance and color of these expanses vary relatively slowly, and their values are transmitted by means of one word of $p$ bits every $p/2$ points. This represents an information flow rate of two bits per point. Each of these words of $p$ bits includes $y$ bits giving the quantified luminance level and $c$ bits providing a definition of the color by means of a color word memory.

These $c$ bits give the address of an $m$-bit color word contained in the memory.

This $m$-bit word is formed of the PCM quantizing levels of two chrominance components. An example of such chrominance components will be given hereinafter.

The color word reception store is updated from the color word transmission store during the line suppression period. The number of lines necessary for this updating depends on the total capacity (M bits) of the memory. M is the product of the number $2^c$ of the stored color words and the length $m$ of each word.

An example of a digital color television system provided by the invention will now be described in more detail, with reference to the accompanying drawings in which.

In the following example, it is supposed that the television standards are 525 lines and 30 images per second, that the data flow rate is 20 Megabits per second, so that $F = 10$ MHz and the bit duration is 50 ns, and that the coding parameters are as follows :

$$a = 2 \text{ bits}$$

$$y = 4 \text{ bits}$$

$$c = 4 \text{ bits}$$

$$m = 12 \text{ bits}$$

$$M = 2^c \times m = 192 \text{ bits}$$

$$p = y + c = 8 \text{ bits}$$

It results therefrom that luminance is digitally transmitted with a period whose minimal value is a eight-bit interval at the rate of 20 Megabits per second, i.e.: $8/(20 \times 10^6) = 0.4$ $\mu$s and corresponds to the case where luminance does not undergo any incremental change. Luminance can incrementally change with a two-bit interval at the rate of 20 Megabits per second, i.e.: $2/(20 \times 10^6) = 0.1$ $\mu$s. As for chrominance, it is digitally transmitted at the same period as luminance by reference to one out of 16 addresses of color words.

Figure 1:
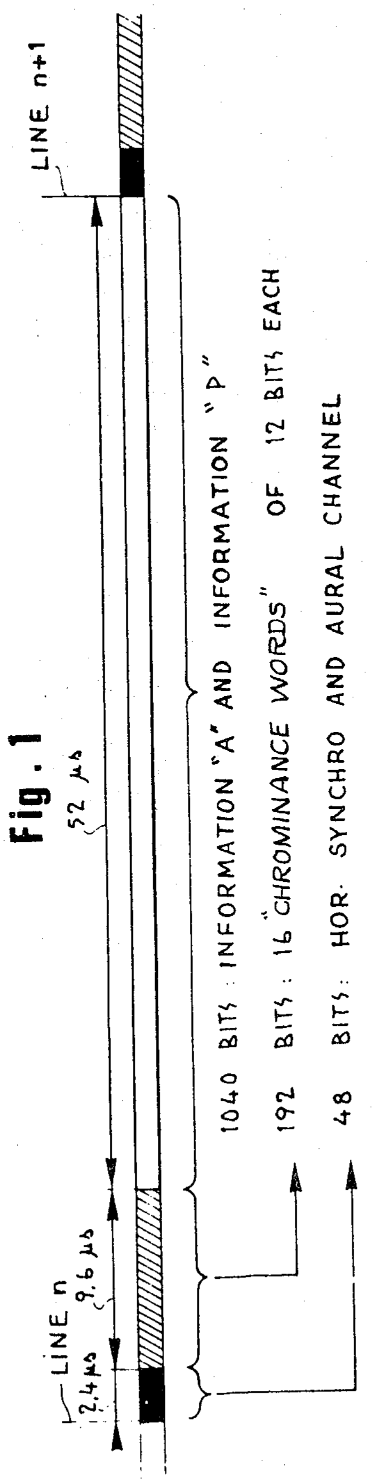
FIG. 1 shows the signals transmitted during one line.

FIG. 1 shows the structure of a line signal. During the 64 microsecond duration of a line, at the transmission of 20 Megabits per second, the line signal comprises 1,280 bits.

During a first 2.4 microsecond period, 48 bits for line synchronization and sound transmission are transmitted. During the following 9.6 microsecond period, 192 bits serving to transfer the color words from the transmission memory to the reception memory are transmitted. Finally, during that portion of a line cut off from the line suppression duration, that is to say 52 microseconds, 1,040 bits are transmitted which relate to the contour data "A" or to the expanse data "P."

Figure 4:
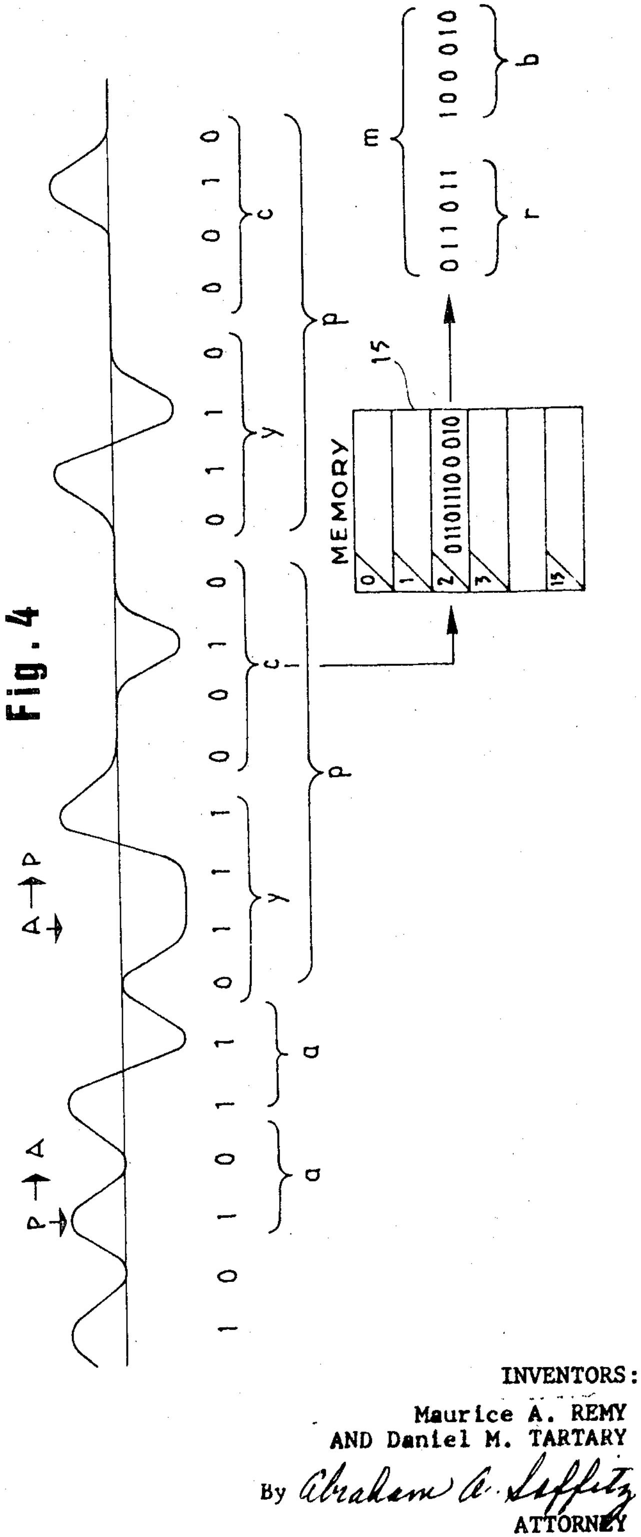
FIG. 4 is an example of a transmitted signal, referred to in the explanation of the analysis of such a signal.

Since it is necessary to separate the two-bit words $a$ relating to the contour data "A" from the eight-bit words $y + c$ relative to the expanse information "P," the successive bits of logic value 1 are transmitted with alternate positive and negative polarity, as will be shown with reference to FIG. 4, and this alternance is interrupted to mark the passage from one type of data to the other.

Figure 2:
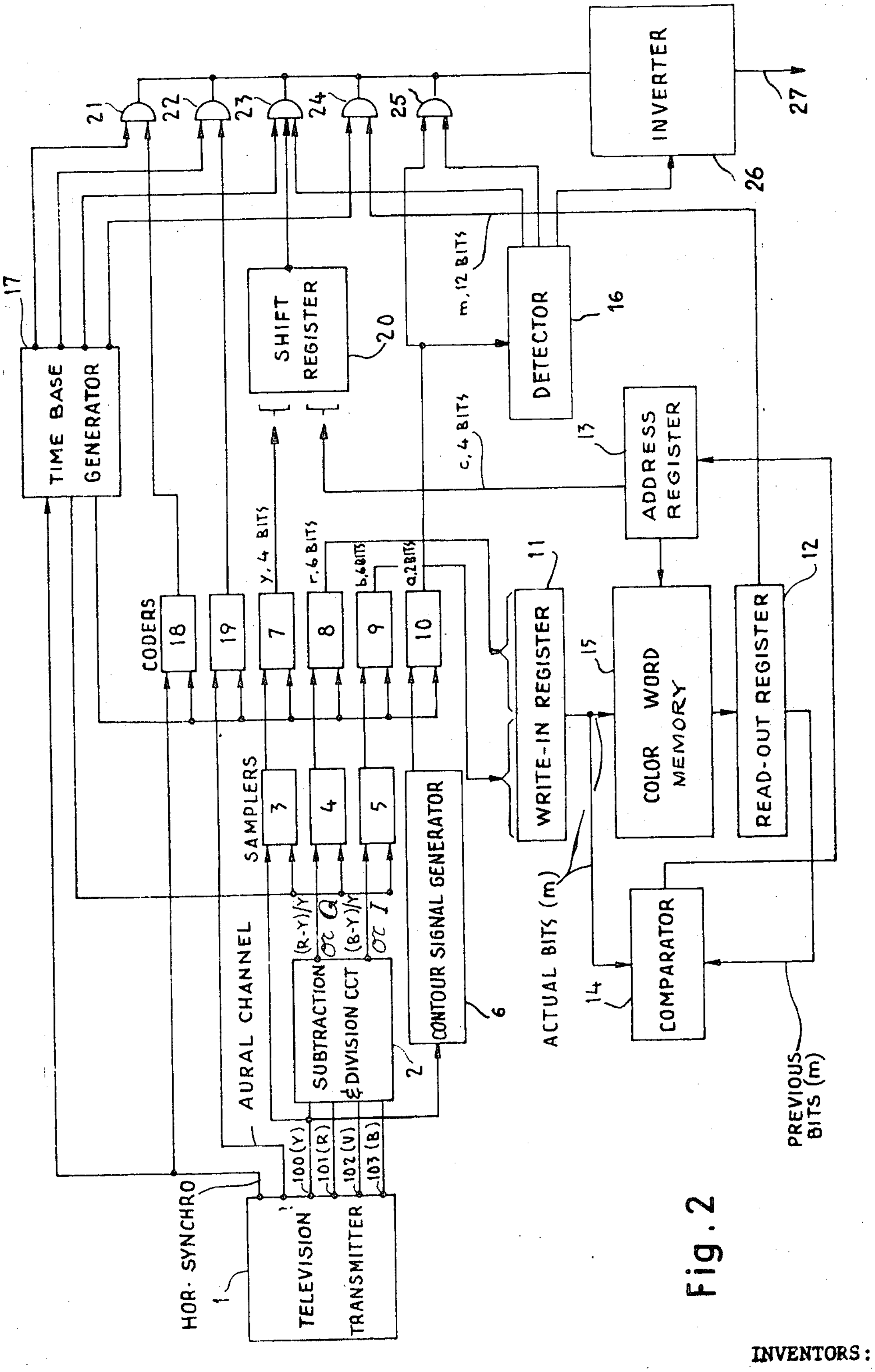
FIG. 2 is a block diagram of the digital television transmitter.

Referring now to FIG. 2, a television transmitter 1 provides on a terminal 100 the luminance signal Y. On terminals 101, 102 and 103 it provides the three primary color signals: red R, green G and blue B. The signals Y, R, G and B are applied to a subtraction and division circuit which gives the signals (R-Y)/Y and (B-Y)/Y in the case of the PAL and SECAM systems and the signals Q and I in the case of the NTSC system. The signals Y, (R-Y)/Y and (B-Y)/Y or the signals Y, Q and I are sampled in samplers 3, 4 and 5 by means of timing pulses at a frequency of 2.5 MHz provided by the time base generator 17. The samples thus obtained are transformed into code pulses (PCM) in respective coders 7, 8 and 9. At the output of coder 7 is obtained the four-bit digital signal $y$, at the output of coder 8 the six-bit digital signal $r$, and at the output of coder 9 the six-bit digital signal $b$. The combination of signals $r$ and $b$ gives the 12-bit word $m$.

The current word $m$ is transferred under the control of time base generator 17 into the write-in register 11 of a memory 15. The memory 15 is provided with a read-out register 12 and is associated with an address register 13 and a comparator 14. A first set of inputs of the comparator 14 are connected to the flipflops of the write-in register 11, and a second set of inputs of the comparator are connected to the flipflops of the read-out register 12.

Before being written in the memory 15, the current color word $m$ is successively compared with the preceding color words $m$ already written in the memory. To this effect, the address register 13 advances step by step and the stored words are successively transferred into the read-out register 12 and compared in the comparator 14 with the word held in the write-in register 11. If the comparison between the current word and one of the preceding words is positive, the comparator provides a signal which halts the address register 13 on the address corresponding to this positive comparison. It is this last address $c$ which is transmitted to the receiver.

If the comparison between the current word and all the preceding words is negative, the current word is written into the memory in an available division of the latter, and the address $c$ in which it is written is transmitted to the receiver.

In order to avoid the total number of color words which must be memorized exceeding the capacity of the memory, namely 16 words, it is necessary to introduce a tolerance at the successive comparison stage. Two of the words $m$ will be considered different only if, at one and the same time, the difference between their values $r$ exceeds a particular threshold $\Delta r$ and the difference between their values $b$ exceeds a threshold $\Delta b$. $\Delta r$ and $\Delta b$ are set to optimal values in accordance with the nature of the transmitted image, the noise level obtained before coding, and so on. It is well known that, to perform an approximate comparison between two binary numbers, it is sufficient to disregard comparison of the lower weight bits.

The signals $y$ and $c$ are introduced in series into a shift register 20 to give the eight-bit signal p.

The analog signal Y, a function of time $t$ and always positive, is applied to a conventional delay line circuit 6 which is sometimes described as a "crispener" and which delivers the horizontal contour signal :

$$A(t) = \frac{\dfrac{Y(t) - Y(t-\tau)}{\tau} - \dfrac{Y(t) - Y(t+\tau)}{\tau}}{\tau} \simeq Y''(t)$$

where $\tau$ is approximatively equal to 100 nanoseconds.

The contour signal A is quantified in coder 10 according to the following binary code :

$a = 0\,0 \text{ if } -\alpha_1 < A < +\alpha_2$ $a = 0\,1 \text{ if } A \leq -\alpha_1$ $a = 1\,0 \text{ if } +\alpha_2 \leq A < \alpha_3$ $A = 1\,1 \text{ if } A \geq \alpha_3$ The thresholds $-\alpha_1$, $+\alpha_2$ and $+\alpha_3$ are adjusted to optimum values according to the nature of the transmitted images, the noise level before coding, and so on.

The sound and line synchronization signals are converted to coded pulses in coders 18 and 19.

The coder 10, the coder 18, the coder 19, the shift register 20 and the read-out register 12 are linked to the transmission channel, whether comprising a conductor or an antenna, through respective AND gates 21, 22, 23 and 24. These gates are opened by the time base generator 17 in periods indicated in FIG. 1. The time base generator 17 is synchronized by the line synchronization signals.

A detection circuit of signal *a* 16 causes gate 23 to open if $a = 00$ (this value of *a* is not transmitted) and gate 25 to open if $a = 01$, 10 or 11.

A polarity inverting circuit 26 reverses the polarity of the signal i a transmitted on channel 27 at each non-null bit (pseudo-ternary signal). For each change of state of circuit 16, that is to say if the signal *a* becomes null at the beginning of a quasi-uniform expanse or if it ceases to be null at a horizontal transition, the polarity alternance of signal 27 is interrupted and three successive bits are transmitted with the same polarity.

The pulse-code modulated signals thus form frames, the word "frame" being employed here in the sense used in pulse code modulation technique and not in its usual sense in television, each corresponding to one line of the image. The beginning of each such frame is marked by a frame synchronization signal, as is well-known. The means for producing this frame synchronization signal are contained in the coder 18.

Figure 3:
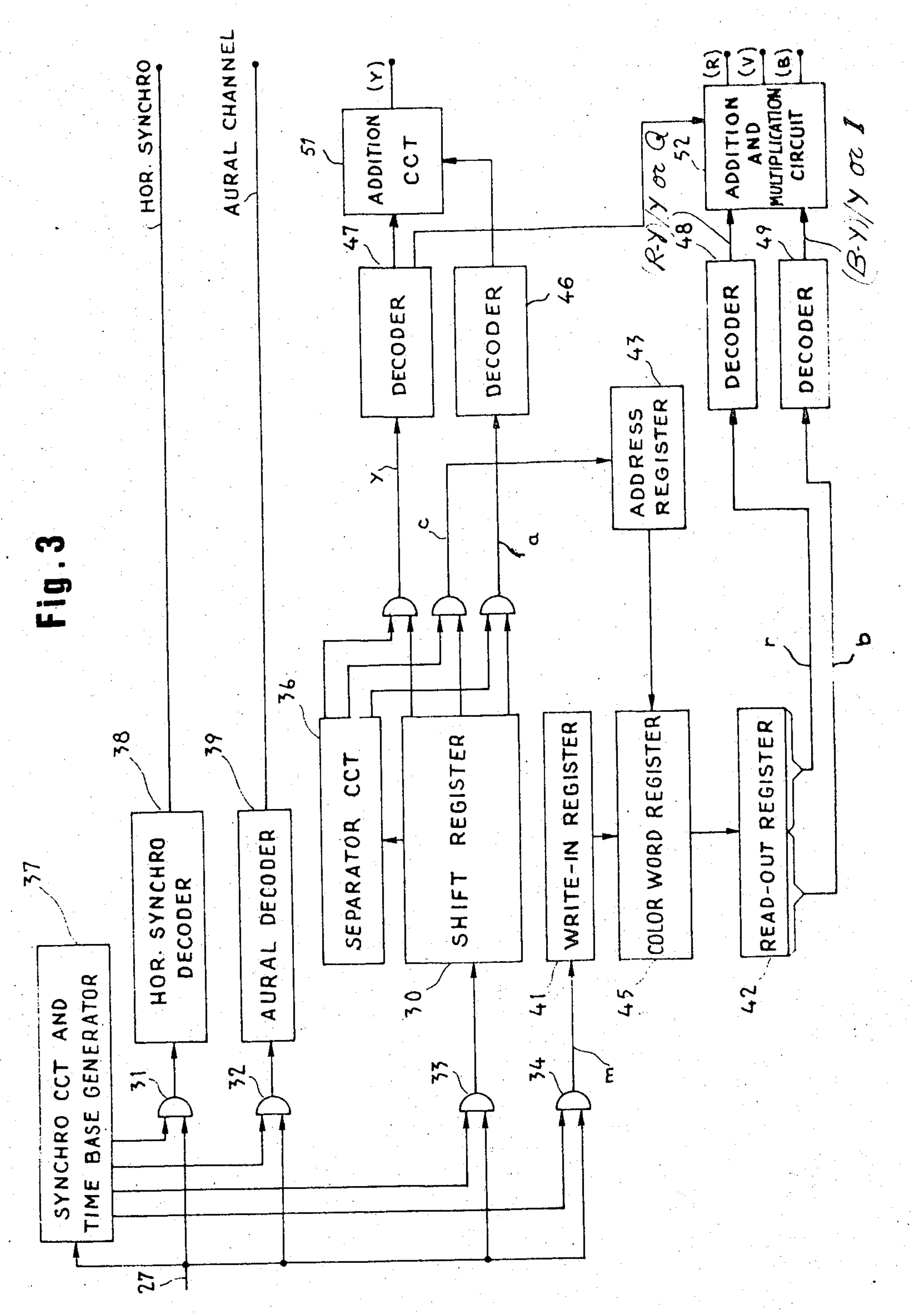
FIG. 3 is the block diagram of the digital television receiver.

Referring now to FIG. 3, the modulated signals in code pulses are received in a "flywheel" type synchronization circuit 37 forming a synchronized time base generator, and are separated according to their location in the frame into line synchronization pulses, sound pulses, image pulses, and color words *m*. This separation is carried out by means of gates 31, 32, 33 and 34. The line synchronization pulses and sound pulses are received by respective decoders 38 and 39 respectively corresponding to coders 18 and 19, the image pulses in a register 30 and the color words in the write-in register 41 of a memory 45.

By means of a separator circuit 36 which responds to polarity changes of the successive non-null bits of the received signals, the signals *a*, *y* and *c* are separated at the output of shift register 30. The address *c* is transferred to the address register 43 of the color word memory 45, and the signal *y* is transferred to a decoder 47 at the output of which is obtained the luminance signal corresponding to the quasi-uniform expanses of the image.

The signal *a* corresponding to the luminance increments is decoded in decoder 46, and the decoded signal is added to the preceding signal in the adder circuit 51 so as to reconstitute the complete luminance signal Y.

A color word *m* is read in the read-out register 42 under the control of the signal *c*. Its portion *r* is transferred to the decoder 48 and its portion to the decoder 49. At the respective outputs of these decoders are obtained the chrominance signals (R-Y)/Y and (B-Y)/Y in the case of PAL and SECAM systems and the chrominance signals Q and I in the case of the NTSC system. These two signals are applied to an addition and multiplication circuit 52 from which the signals R, G and B are obtained.

It will be understood that the circuits 2 and 52 could be situated in the digital portion of the system rather than in the analog portion.

FIG. 4 represents a pulse code modulated signal. It is of the pseudo-ternary type, that is to say that the binary zeros correspond to zero-amplitude pulses while the binary ones correspond to pulses of unit amplitude and of alternatively positive and negative polarity. The regular alternation of the positive and negative pulses is interrupted at transitions of data "A" to data "P." Consequently, the passage from one type of data to the other is marked by three successive pulses having the same polarity. FIG. 4 shows the quantities *a*, *y*, *c* y, *m* which are hereinabove defined.

What we claim is:

1. A digital PCM coded color television system comprising:

a. at a transmitter station, means for analyzing, during line analyzing periods separated by blanking periods, the lines of a color object to be transmitted and for generating an analog signal representative of the luminance of the lines of the object, b. means for continuously detecting the amplitude of the variation undergone by said analog luminance signal during a predetermined time and thereby forming an analog signal representative of the increments of the luminance of the lines of the object, c. means for converting said analog luminance signal and said analog luminance increment signal respectively into a digital luminance ACM signal and a digital luminance increment PCM signal, d. means for deriving from the color object to be transmitted two independent analog chrominance signals and for converting the same into two associated digital chrominance PCM signals, said two associated digital chrominance PCM signals forming chrominance word signal, e. a generating means for generating addresses and a transmit storing means for storing at predetermined addresses generated by said generating means the chrominance word signals, said transmit storing means including means for transmitting said chrominance word signals during the blanking periods, f. means for transmitting said digital luminance PCM signal and said digital luminance increment PCM signal and the addresses of the chrominance word signals during the line analyzing periods;

g. at a receiver station, means for receiving the signal transmitted from the transmitter station, h. means for deriving from said digital luminance PCM signal and said digital luminance increment PCM signal, an analog signal representative of the luminance of the lines of the object, i. a receiver storing means including supplying means for supplying address signals to the storing means of said receiver and means for storing at the addresses transmitted from said transmitter station, during the line analyzing periods, the chrominance word signals transmitted therefrom during the blanking periods, j. and means for deriving two independent analog chrominance signals from the chrominance word signals stored in said receive storing means.

2. A digital coded color television system according to claim 1 in which the means for continuously detecting the amplitude of the variation undergone by the analog luminance signal and thereby forming an analog signal representative of the increments of the luminance of the lines of the object comprises means for scanning the lines of said object and forming a video signal, means for applying said video signal to a crispener device generating a signal equal to the second derivative of said video signal with respect to time.

3. A digital PCM coded color television system according to claim 1 in which the two independent analog chrominance signals are the I-signal and the Q-signal of the NTSC color television system.

4. A digital PCM coded television system according to claim 1 in which the two independent analog chrominance signals are the difference signals (R-Y) and (B-Y) of the PAL and SECAM color television systems in which R and B are respectively the red and blue component signals and Y the luminance signal.

5. A digital PCM coded color television system according to claim 1 in which the two independent analog chrominance signals are the signals (R-Y)/Y and (B-Y)/Y where R and B are respectively the red and blue component signals and Y the luminance signal.

* * * * *